(12) United States Patent
Woodall

(10) Patent No.: US 7,283,627 B2
(45) Date of Patent: Oct. 16, 2007

(54) HANDS-FREE COMMUNICATOR

(76) Inventor: Jonathan H. Woodall, 3132 Elmendorf Dr., Oakton, VA (US) 22124

( * ) Notice: Subject to any disclaimer, the term of this patent is extended or adjusted under 35 U.S.C. 154(b) by 311 days.

(21) Appl. No.: 10/113,782

(22) Filed: Apr. 1, 2002

(65) Prior Publication Data

US 2003/0185388 A1 Oct. 2, 2003

(51) Int. Cl.
*H04M 1/00* (2006.01)

(52) U.S. Cl. ....................... 379/456; 379/447
(58) Field of Classification Search ................ 379/456, 379/447
See application file for complete search history.

(56) References Cited

U.S. PATENT DOCUMENTS 2,473,106 A * 6/1949 Mathieson .................. 379/447
6,735,453 B1 * 5/2004 Bobisuthi et al. ........... 379/447

* cited by examiner

*Primary Examiner*—Jack Chiang
(74) *Attorney, Agent, or Firm*—Mayer Fortkort & Williams PC

(57) ABSTRACT

An apparatus for enabling hands free activation of a telephone includes a base, a telephone unit and a mechanical actuator via which a user can activate the telephone unit without using his or her hands. The telephone unit has an ON/OFF button that can be switched between an ON state and an OFF state. The mechanical actuator is operable by a user's chin and is mountable to the base. The actuator is disposed above the telephone unit and aligned with the ON/OFF switch so that pressing down on the actuator switches the ON/OFF button between its two states. This telephone unit, when used in conjunction with a voice recognition dialing service allows the user to place calls without the use of his or her hands. The telephone unit is coupled to the base and is activated by activation of the ON/OFF switch via the user's chin or other body part.

18 Claims, 4 Drawing Sheets

HANDS-FREE COMMUNICATOR

FIELD OF THE INVENTION

The present invention relates generally to methods and apparatuses for enabling one to communicate via telephone, and more particularly to a method and apparatus for enabling a physically challenged person to communicate via the telephone.

BACKGROUND

Many physically challenged individuals lack the ability to mechanically interact with a telephone, which is necessary to make and receive telephone calls. This inability can cause difficulties for such individuals when left alone. Providing use of the telephone opens up the world to these individuals and gives them a sense of independence.

The present invention is therefore directed to the problem of developing a method and apparatus for enabling a physically challenged individual to interact mechanically with a telephone to enable the individual to make and receive telephone calls.

SUMMARY OF THE INVENTION

The present invention solves these and other problems by providing a hands-free telephone apparatus that enables an individual to initiate and receive telephone calls without requiring the use of one's hands.

According to one aspect of the present invention, an exemplary embodiment of an apparatus for enabling a user to make and receive telephone calls without using his or her hands includes a base, a telephone unit with an activation button, and a mechanical actuator. This particular embodiment is operable by a user's chin or other body part. A base provides the support for the remaining pieces. A telephone unit is mounted to the base and has an ON/OFF button that can be switched between an ON state and an OFF state. A mechanical actuator is operable by a user's chin or similar body part. The actuator is mountable to the base and is disposed above the telephone unit and is aligned with the ON/OFF button. The telephone unit is activated/deactivated by pressing the ON/OFF button, which in turn can be activated by the user's chin or other body part. The telephone unit, when used with voice recognition dialing service from the telephone company, allows the user to initiate a telephone call, dial the number with the voice recognition dialing service and hang up the telephone when the call is complete.

According to another aspect of the present invention, the apparatus may include a headset that is coupled to the telephone unit.

According to yet another aspect of the present invention, a chin rest can be mounted on the end of the actuator into which a user places his or her chin by which the user actuates the ON/OFF button.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
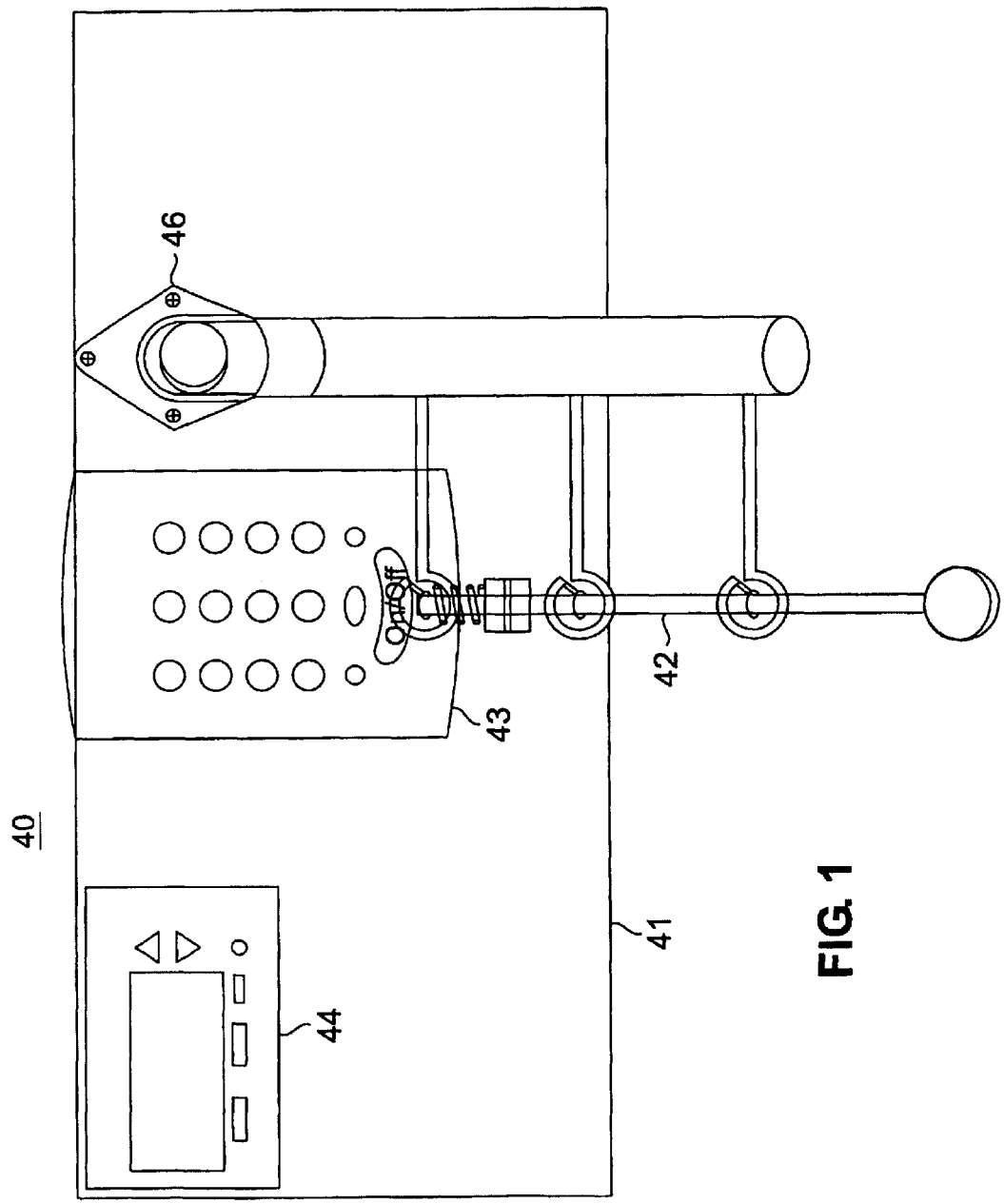
FIG. 1 depicts a top view of an exemplary embodiment of an apparatus for enabling a user to make and receive telephone calls without using his or her hands according to one aspect of the present invention.

FIG. 1 shows an exemplary embodiment 40 of an apparatus for enabling a user to make and receive telephone calls without using his or her hands. This particular embodiment is operable by a user's chin or other body part. A base 41 provides the support for the remaining pieces. The base 41 is sufficiently small that it can be placed in the user's lap or on a flat surface. A telephone unit 43 is mounted to the base 41 and has an ON/OFF button that can be switched between an ON state and an OFF state. A mechanical actuator 42 is operable by a user's chin or similar body part. The actuator 42 is mountable to the base 41 and is disposed above the telephone unit 43 and aligned with the ON/OFF button. A caller ID (Identification) unit 44 is coupled to the telephone unit 43. The telephone unit 43 is activated by activation of the ON/OFF button, which in turn can be activated by the user's chin or other body part. The apparatus may include a headset (not shown) coupled to the telephone unit 43. The headset is a standard headset that includes a microphone and a speaker. A chin rest (not shown) can be mounted on the end of the actuator 42 against which a user places his or her chin by which the user actuates the ON/OFF button.

Figure 2:
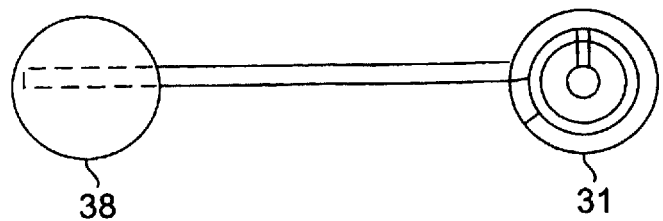
FIG. 2 depicts an axial view of an exemplary embodiment of a mechanical actuator for use in the various embodiments according to another aspect of the present invention.
Figure 3:
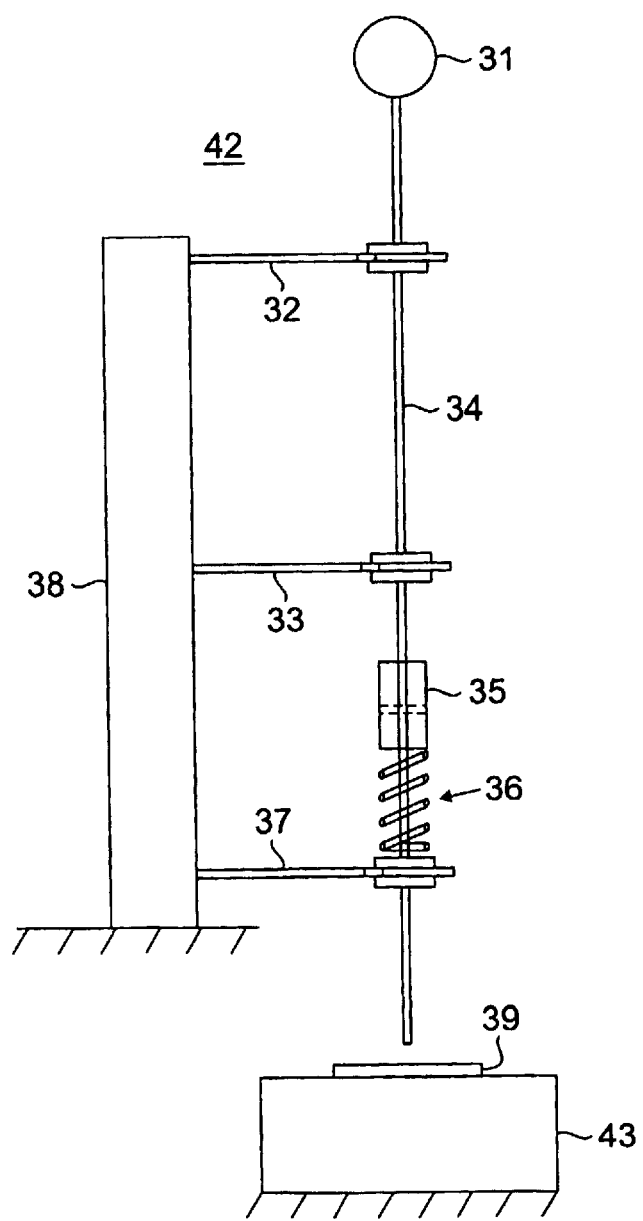
FIG. 3 depicts an orthogonal view of the mechanical actuator of FIG. 2 relative to the axis of the mechanical actuator.

FIG. 2 shows an axial view of an exemplary embodiment of the mechanical actuator 42 for use in the embodiment of FIG. 1 in a top view. FIG. 3 shows the embodiment 42 in a view orthogonal to the axis of the mechanical actuator.

When used in conjunction with a telephone unit with a headset and phone service with Voice Recognition dialing capability, the Hands-Free Communication device enables a person to make and receive telephone calls without the use of his or her hands. The embodiment allows the origination and termination of phone calls without hand mobility, as well as transferring between two calls using a call waiting function. The embodiment initiates the Voice Recognition feature, where any frequently used numbers can be stored, and does not require the user to push any numeric buttons on the phone set. An exemplary voice-recognition dialing feature is a service provided by Verizon Communications, termed EasyVoice™.

EasyVoice™ is a service provided by Verizon that allows you to make calls by simply speaking the name of the person or place you want to reach. Voice Dialing can be used with speakerphones. Once a dial tone is heard, the user simply states the name of the number the user wishes to call. New telephone numbers can be added by calling a predetermined telephone number and interacting with a menu that enables association of a voice name with an entered telephone number.

Figure 4:
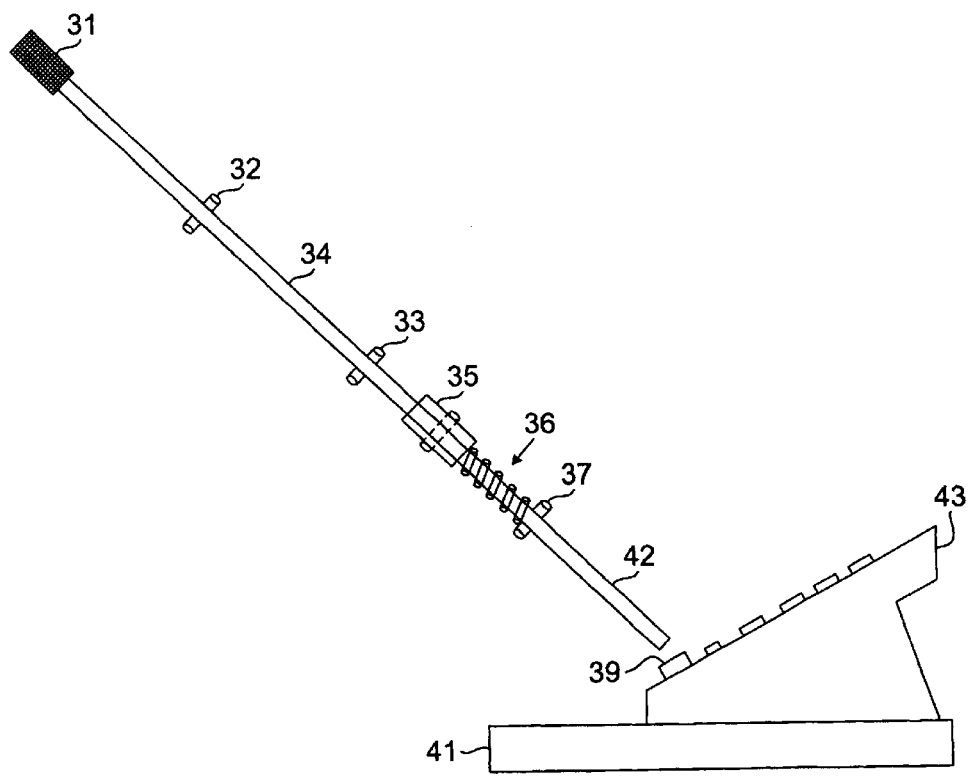
FIG. 4 depicts a side view of an exemplary embodiment of a mechanical actuator according to another aspect of the present invention.

Referring to FIG. 1, the exemplary embodiment 40 includes a base 41, a telephone unit 43, a headset 61 with earpiece 62 (see FIG. 5), and an actuator 42. A caller ID display device 44 may also be included. One exemplary implementation of the base 41 comprises a 7½-inch by 15½-inch by ¹³⁄₁₆-inch wooden block. The Base Unit 41 serves as the attachment point for the component parts of the Hands-Free Communicator. Turning to FIG. 4, shown therein according to one aspect of the present invention is the exemplary embodiment 40 in a side view. The embodiment 40 includes a base 41, a mechanical actuator 42 attached to the base at an angle relative to a perpendicular line extending upwards from the base. This angle can be adjusted depending upon the angle of the user relative to the base.

One exemplary embodiment for attaching other units to the base 41 includes Velcro® material, which Velcro® serves as a means of connecting the telephone unit 43 to the base unit 41. Two Pieces of Velcro® fuzzy loop material, each piece being 2" wide by 7" long, are used for this purpose. Two 7" long pieces of 2" wide Velcro® fuzzy loop material are glued to the top of the base unit 41. This material allows easy adjustment of the telephone unit 43 on the base unit 41 to line up the small dowel over the On/Off switch, as described below.

Velcro® rough hook material glued to the bottom of the telephone unit serves to connect the telephone unit 43 to the base unit 41. Four (4) squares, ¾-inch by ¾-inch of Velcro® rough hook material can be used.

A Flag Holder Bracket 46 or other similar bracket is used to hold the actuator 42. The bracket 46 holds the large dowel at a 45-degree angle to the base for ease of actuation. The flag holder bracket is one that is sized for a one-inch diameter pole. The holder is attached to the base by three (3) screws.

Figure 5:
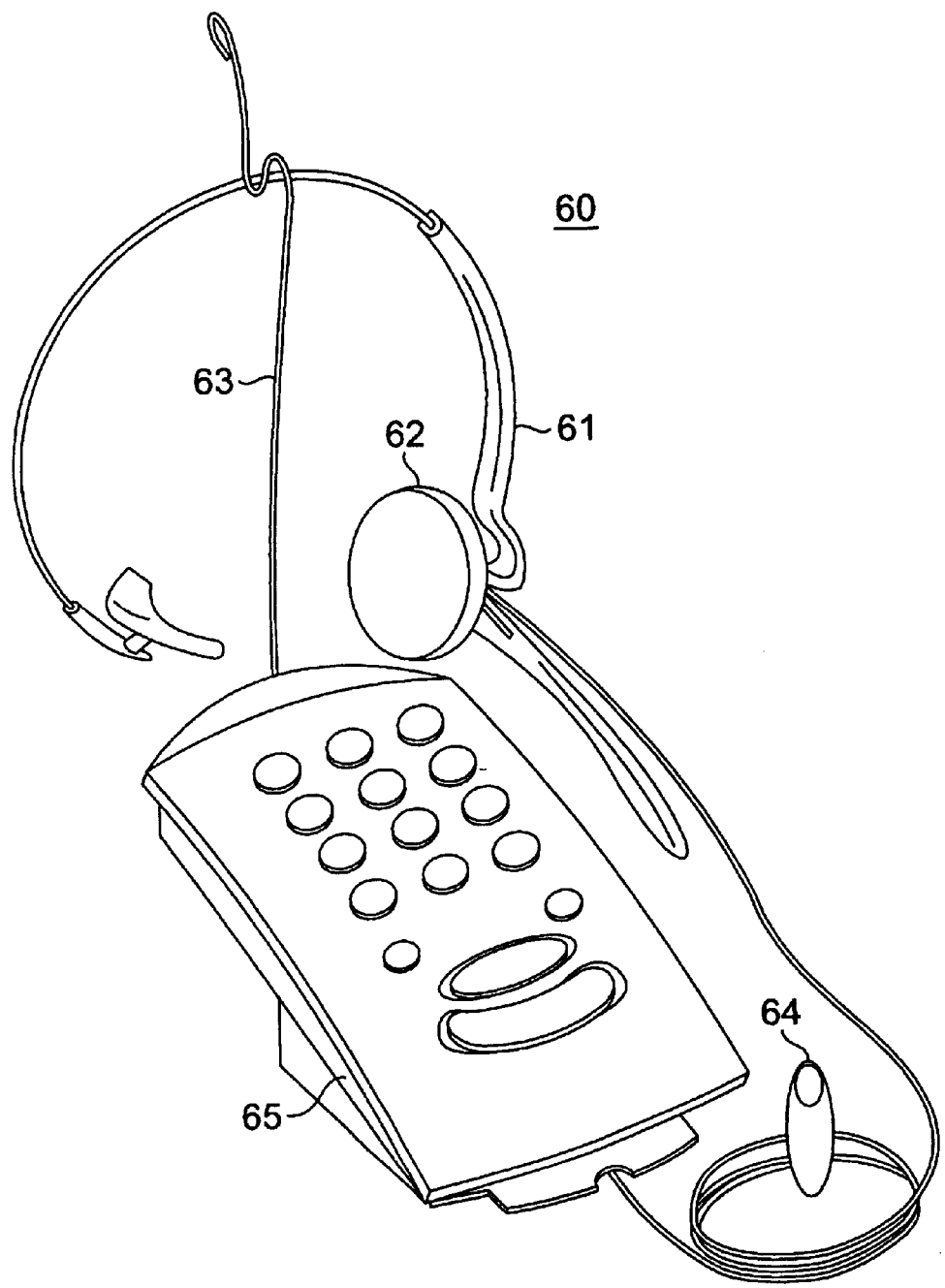
FIG. 5 depicts an exemplary embodiment of a telephone unit for use in the various embodiments of the present invention.

The telephone unit 43 can be similar to a Plantronics telephone, which is shown in FIG. 5. The headset 61 is a two-way communications device that has a microphone 64 for picking up speech and one or two ear speakers 62 for outputting sound directly to the wearer's ear or ears.

An exemplary implementation of the actuator 42 includes a bracket 46, e.g., a flag holder bracket, and headset, two two-inch by seven-inch pieces of Velcro®, one wooden dowel one-inch in diameter and 13½ inches long, another wooden dowel ¼ inch in diameter and 12½ inch long, three cable stand-offs, one nylon bushing, one spring one-half inch in diameter, and one eraser with a ¼ inch hole in the bottom.

Referring to FIG. 5, shown therein is a telephone unit 60 for use in the various embodiments set forth herein. An exemplary telephone unit includes a Plantronics Telephone Model T10, with headset 61 (or any other phone unit that has a hook switch that toggles on or off). Velcro® rough hook surface material is glued to the underside of the telephone unit. The Telephone Unit is then attached to the base by positioning it over the piece of Velcro® fuzzy loop material on the base unit such that the end of the ¼" dowel is in line with the Telephone Unit "On/Off Switch" and the long horizontal axis of the Telephone unit is parallel with the short horizontal axis of the Base Unit.

A large dowel 38 (FIG. 3) is employed as part of the actuator 42. The large dowel is a wooden dowel, one inch in diameter and 13.5 inches long. The one-inch dowel is inserted into the flag bracket 46 and secured by means of the set-screw on the flag bracket.

A second smaller dowel 34 is employed as part of the actuator 42. The small dowel 34 is a wooden dowel, ¼-inch in diameter and 12.5-inches in length. The ¼-inch dowel is held suspended parallel to the one-inch wooden dowel 38 by three cable stand-offs 32, 33 and 37.

The cable stand-offs 32, 33 and 37 serve as a means of holding the small dowel 34 fixed in space so that it can move longitudinally. The first Cable Stand-Off 32 is screwed one-half inch from the top end of the dowel 38 so that the center of the plastic cable guide 32 is three inches from the center of the dowel 38. The second Cable Stand-Off 33 is screwed four inches down the dowel 38 from the first cable guide 32, and likewise with the third cable guide 37.

An eraser tip 31 (or similar cushioning piece) fits on the top end of the small dowel 34 to provide a cushion to the user when the user wants to push the small dowel 34 with his or her chin or other similar body part.

To assemble the Hands-Free Communicator, first screw the flag holder 46 onto the wooden base 41. Then insert the 13½-inch long, one-inch diameter, dowel 38 into the opening of the flag holder 46 that is at a 45-degree angle from the base 41 (see FIG. 4). Screw the first cable stand-off 32 one-half inch from the top end of the dowel 38 so that the ring is three inches from the side of the dowel 38. Screw the second cable stand-off 33 four inches down the dowel 38 from the first 32, and likewise with the third stand-off 37. These stand-offs 32, 33 and 37 serve to hold the 12½-inch long, one quarter-inch diameter, dowel 34 the exact distance, three inches, from the center of the fixed dowel 38 in the flag holder 46. Glue the two pieces of fuzzy loop Velcro® starting three quarters (¾) of an inch to the left of the flag holder 46. While holding the spring and nylon bushing in line with and above the cable stand-off 37 closest to the telephone unit 43, thread the 12½-inch long small diameter dowel 34 through the three cable stand-offs 32, 33 and 37. A bushing ensures that the dowel 34 cannot be moved out of place, and the spring 36 allows the On/Off button 39 to be pushed and released. The nylon bushing 35 is held in position on the small dowel by drilling a one thirty-second (¹⁄₃₂) of an inch hole through both the bushing and the dowel, placing a paper clip through the hole, and bending over the ends of the paper clip. Finally, slip the eraser tip 31 onto the top end of the dowel 34. This provides a cushion when the user pushes the eraser tip 31 on the small dowel 34 with their chin to place or receive a call. Then, affix the telephone unit 43 stationary by gluing four Velcro® rough hook material three quarters of an inch squares on the bottom of the telephone unit 43 and attaching the telephone unit 43 to the fuzzy loop Velcro® material on the base 41 such that the small dowel 34 is aligned over the on/off switch 39.

The Hands-Free Communicator allows for the operation of the On/Off switch 39 on the telephone unit 43, e.g., a Plantronics™ Model T10 telephone set, or any other phone set that has a hook switch that toggles on and off, by means of a control rod 34 fixed in space relative to the base unit 41. This control rod 34 can move along its long cylindrical axis an amount necessary, approximately one-half (½)-inch, to toggle on or off the telephone set On/Off switch 39. The control rod 34 is positioned such that a person, without the use of their hands, can turn on or turn off a telephone set 43. These operations in conjunction with Verizon's EasyVoice™ voice recognition dialing service allows one to place a call to any pre-programmed number or use voice recognition dialing to dial "zero," connect with the operator, and have their desired number dialed by the operator.

The rod for the operations of the phone set is held in space by the following component parts.

(a) A flagpole bracket is used to hold a one-inch diameter wooden dowel at a 45-degree angle from the base unit with the main axis of the dowel orthogonal to the front face of the telephone unit.

(b) Three cable standoffs are attached to the one inch diameter dowel by making one-eighth of an inch diameter holes, perpendicular to the main axis, four inches apart, with the first hole being one-half inch from the outer end of the dowel.

(c) The cable standoffs are screwed into the holes in the large dowel until the distance from the center of the plastic cable guide is 3 inches from the center of the large wooden dowel.

(d) The plastic cable guides are slightly smaller than the one-quarter (¼)-inch diameter dowel. Hence each of the plastic cable guides must be reamed out with a circular file to expand their inner diameter to just more than one quarter of an inch.

(e) The three cable standoffs are screwed into the large dowel until the cable guides are aligned on a common axis such that the one-quarter inch dowel can be placed through them.

(f) The one-quarter inch dowel is then placed through the top two guides and then is placed through a one-inch long nylon bushing and a cylindrical helical plastic spring, one-half inch in diameter, one and one-half inches long, and with four turns per inch. The one-quarter inch dowel is positioned such that at rest the end of the dowel is about one quarter of an inch above the on/off switch on the telephone unit.

Although various embodiments are specifically illustrated and described herein, it will be appreciated that modifications and variations of the invention are covered by the above teachings and are within the purview of the appended claims without departing from the spirit and intended scope of the invention. For example, various dimensions are set forth herein, however, other dimensions could easily be employed without departing from the scope of the present invention. Additionally, an example of the mechanical actuator is set forth herein, however, other mechanical actuators can be employed without departing from the scope of the invention. Furthermore, these examples should not be interpreted to limit the modifications and variations of the invention covered by the claims but are merely illustrative of possible variations.

What is claimed is:

1. An apparatus for enabling hands free activation of a telephone comprising:
    a base;
    a telephone unit mountable to the base and including an ON/OFF button that is switchable between an ON state and an OFF state; and
    a mechanical actuator operable by a user's chin, said actuator being mountable to the base and being disposed above the telephone unit and aligned with the ON/OFF button, wherein the mechanical actuator comprises two cylindrical rods arranged in parallel and coupled together, a first one of the two rods being attached to the base and a second one of the two rods being aligned vertically with the ON/OFF bottom.

2. The apparatus according to claim 1, further comprising a headset coupled to the telephone unit and including a microphone and a speaker.

3. The apparatus according to claim 1, further comprising a chin rest mounted on the end of the actuator into which a user places his or her chin by which the user actuates the ON/OFF button.

4. The apparatus according to claim 1, wherein the second rod is movable vertically and rotatable in a plane about the first rod.

5. The apparatus according to claim 1, further comprising a bracket mounted to the base into which the first rod is disposable and securable.

6. An apparatus for actuating a telephone unit without using one's hands comprising:
    a base;
    a fixed rod mountable to the base; and
    a rotatable rod depressible by a user's body part, said rotatable rod attached to the fixed rod and rotatable in a horizontal plane about the fixed rod to align an end of the rotatable rod above a telephone hook switch, said rotatable rod including a spring-loaded mechanism that enables the rotatable rod to be moved vertically to contact the hook switch when depressed by a user's body part and to spring back when released.

7. The apparatus according to claim 6, wherein the fixed rod and the rotatable rod are disposed at an angle between 30 and 60 degrees relative to the telephone hook switch.

8. The apparatus according to claim 6, further comprising a telephone unit having a hook switch that activates the telephone unit when depressed.

9. The apparatus according to claim 7, wherein the telephone unit is mounted to the base.

10. The apparatus according to claim 6, further comprising a rubber-like material mounted at an end of the rotatable rod that contacts a user's body part.

11. The apparatus according to claim 6, further comprising a plurality of horizontal rings attached to the fixed rod and providing support for the rotatable rod.

12. The apparatus according to claim 7, wherein the telephone unit includes a headset having a microphone and an earpiece.

13. The apparatus according to claim 5, wherein the fixed rod is mounted to the base with a bracket.

14. An apparatus for enabling a user to operate a telephone having voice recognition telephone dialing service without hands, comprising:
    a base unit;
    a telephone unit mounted to the base unit and including an on/off switch;
    a mechanical actuator mounted to the base unit and being operable by a body part of a user, wherein the mechanical actuator includes a rod and a spring-loaded mechanism that controls a vertical travel of the rod so that the rod when depressed by a user contacts the on/off switch and returns to a position above the on/off switch when released by a user.

15. The apparatus according to claim 14, wherein the mechanical actuator is operable by a user's chin.

16. The apparatus according to claim 14, wherein the mechanical actuator includes an alignment mechanism via which a user can align the mechanical actuator above the on/off switch.

17. The apparatus according to claim 16, wherein the alignment mechanism includes a fixed support attached to the base and a rotatable mechanism in which the rod is attached.

18. The apparatus according to claim 14, wherein the mechanical actuator includes a chin rest.

* * * * *